Feb. 12, 1952 — H. J. HAMMERLY — 2,585,770

POLARIZED POWER TAKE-OFF FOR BUS DUCT SYSTEMS

Original Filed Oct. 16, 1947 — 2 SHEETS—SHEET 1

INVENTOR
HERMAN J. HAMMERLY
BY
ATTORNEY

Feb. 12, 1952      H. J. HAMMERLY      2,585,770
POLARIZED POWER TAKE-OFF FOR BUS DUCT SYSTEMS
Original Filed Oct. 16, 1947      2 SHEETS—SHEET 2
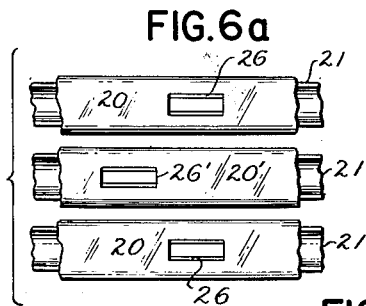
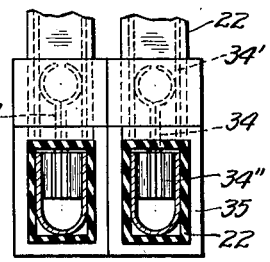
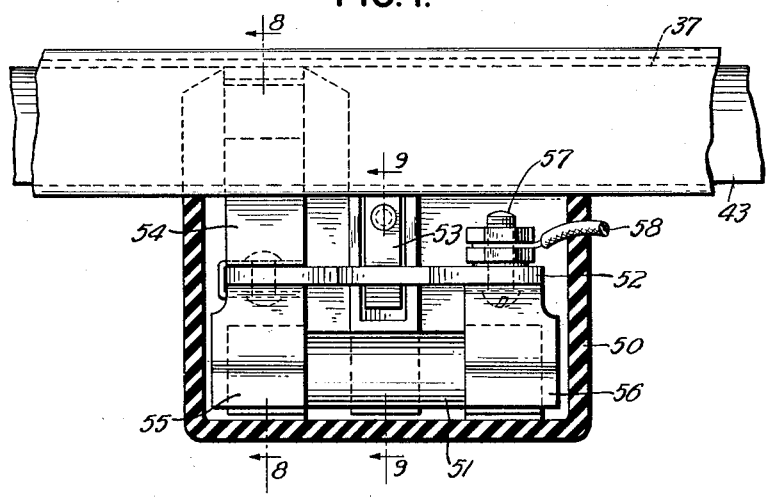
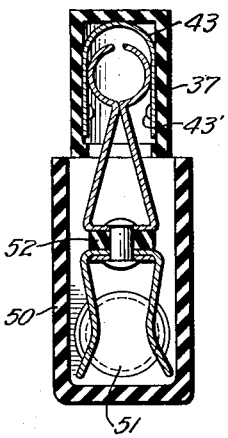
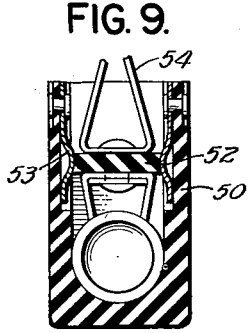
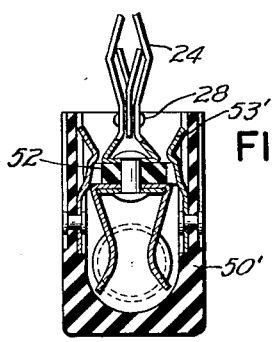
INVENTOR
HERMAN J. HAMMERLY
BY
ATTORNEY Patented Feb. 12, 1952

2,585,770

UNITED STATES PATENT OFFICE 2,585,770

POLARIZED POWER TAKE-OFF FOR BUS DUCT SYSTEMS

Herman J. Hammerly, Plainville, Conn., assignor, by mesne assignments, to General Electric Company, a corporation of New York Original application October 16, 1947, Serial No. 780,212. Divided and this application September 14, 1948, Serial No. 49,176

3 Claims. (Cl. 173—334.1)

One object of my invention is to provide branch take-off means for a power distribution system such as set forth in my application Serial Number 780,212 filed October 16, 1947 (now Patent 2,453,314 dated November 9, 1948), from which this application is a division.

Another object of my invention is to provide branch take-offs for a power distribution system which is simple but flexible and readily adapted to installation in various ways and easy change from one arrangement to another.

Another object is to provide branch take-offs for a system which can be readily polarized.

Basically the system employs sections of channel-like bus bars slidably enclosed in insulating tubes and provided at the end of each section and at intervals along its length with sockets adapted to receive a connected prong on the opposite end of another section or a prong of a branch take-off device respectively. Each bus bar conductor is thus enclosed in its own individual tube.

Details of the system and of branch connectors will be understood from the following.

Fig. 6 is a sectional view of a pair of bus bars and ducts taken at a corner connection.

Fig. 6a is a face view of fragments of three bus bars with their ducts in which the openings for access to the bars are arranged offset so as to ensure proper polarity connection when take-off plugs are inserted.

Fig. 7 is an enlarged side view and partial section showing a part of a duct with a fuse protection branch take-off device.

Fig. 8 is a cross-sectional view of the same on the plane of the line 8—8 of Fig. 7.

Fig. 9 is a cross-sectional view on the plane of the line 9—9 of the housing of Fig. 7.

Fig. 10 is a cross-sectional view of a take-off device showing the form of prong of Figs. 2 and 3 and another arrangement for holding it in place in the housing.

Figure 1:
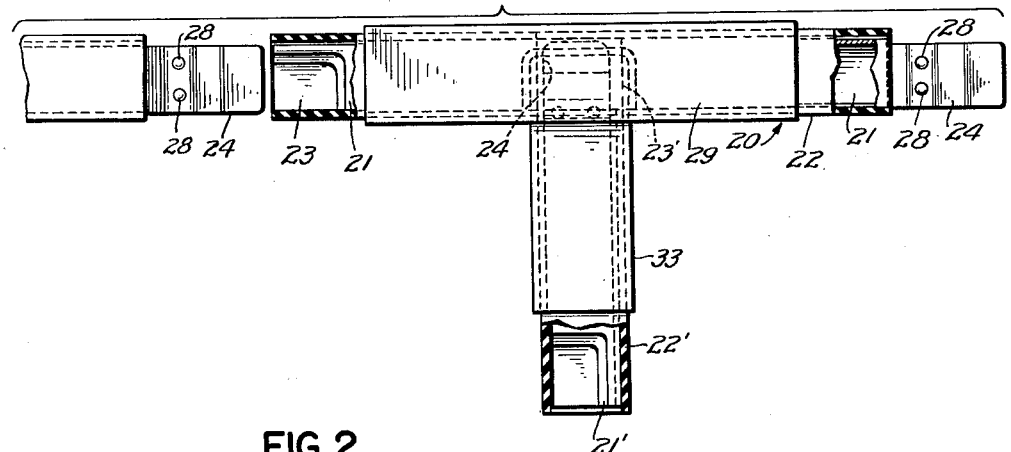
Fig. 1 is a fragmentary side view and partial section of one form of my invention showing the right hand end of a bus bar in position to join an adjacent bus bar and a branch take-off.

The invention is applicable to installations involving one or more conductors. For instance, in Figs. 1 and 2, I have shown a single run 20 and in Figs. 4, 5 and 6 two runs 20, 20. Bus bars 21, 21 may be considered as parts of either a common circuit or as being separate parts of a common conductor. Each bus bar is enclosed in a duct 22 formed of a tube of suitable insulating material such as indurated fibre or any other material considered satisfactory under the conditions of use. Each bus bar is formed of suitable metal in channel form and made up in sections of suitable length. Each section has a socket portion 23 at one end and a prong portion 24 at the other end adapted to fit snugly into a socket on the connected section.

Preferably each bus bar section is enclosed in an individual insulating tube 22 of a little less length than the bus bar so that with respect to a given section, one end of the bus bar, such as the prong end, projects beyond its enclosing tube sufficiently to enable two sections of bus bars to be electrically and mechanically joined when the enclosing tube sections abut against each other. Each bus bar section however is slidable in its tube so that considerable adjustment can be made.

Figure 2:
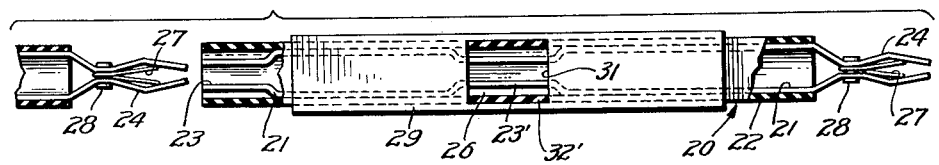
Fig. 2 is a view of the bus bar and duct of Fig. 1 looking upwardly, the branch connection being omitted.

Preferably each socket 23 is formed by bending the side walls of the bus bar channel inwardly as shown in Figs. 1 and 2. These short inwardly bent portions form jaws adapted to receive the wedge-shaped prong end 24. Each bus bar length is also provided with similar socket portions 23' at intervals along its length adapted to receive the prong of another bus bar length or the prong or blade of any other branch connector or take-off device. Each prong portion is formed by bending the side walls of the bus bar as shown in Figs. 1, 2 and 10. The enclosing tube is provided with entrance openings 26 leading to the respective longitudinally disposed sockets 23 for insertion of branch connections.

From the foregoing, it will be seen that each bus bar section is formed of a single strip of metal with an integral terminal prong at one end and a socket at the other end and intervening sockets. Although this is the preferred construction it will be understood that bus bar sections could be formed with sockets at both ends or with integral prongs at both ends to facilitate installation in special cases.

A prong end may be reinforced by an insert 27 having spring fingers secured in place between the sides of the prong end by rivets 28.

To further insure protection I may provide an outer insulating sleeve 29 at any desired point.

When it is desired to connect a branch connection 21' at right angles to a given run as shown in Fig. 1, I may provide an insulating sleeve 29 which has an opening 31 in line with 26 adapted to receive the prong 24' of the branch connection 21' and its tube 22'. This sleeve 29 is located on the tube 22 so as to bring the opening 31 in register with one of the sockets 23' of the bus bar. The tube 22' may have extension walls 32' to embrace the bus bar at the socket 23'. Additional protection is provided by the insulating sleeve 33 on tube 22'.

When an angle is to be turned in a given run, as shown in Fig. 6, the bus bar ducts are suitably connected by a connector 34 which may be formed with a socket 34' on one end and a prong 34" on the other end, or a socket on each end or a prong on each end depending upon whether the ends of the bus bars to be connected are provided with sockets or prongs and enclosed in an insulating housing joint 35 which receives the ends of the sections to be connected.

Figures 3, 4:
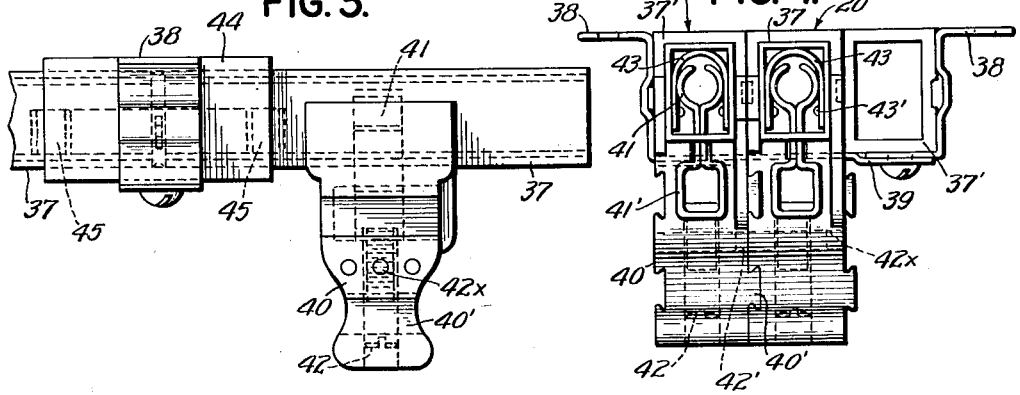
Fig. 3 is a side view of a duct showing a branch take-off embodying another form of the invention.
Fig. 4 is an end view and partial cross section showing multiple bus bars with branch plug connections and means for mounting the ducts.
Figure 5:
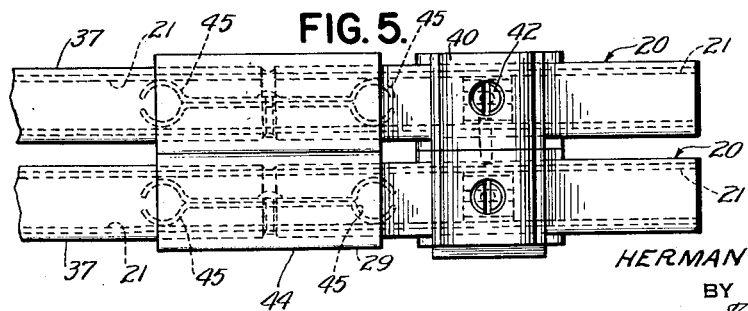
Fig. 5 is a view of the parts of Fig. 3 looking upwardly, the bracket being omitted.

In Figs. 3, 4 and 5, I have shown one method of mounting duct tube sections such as 37, 37 by brackets 38, 38 and a cross strap 39 embracing the connecting sleeves 37', 37'.

These figures also show branch connector plugs 40, 40, each having a blade or prong 41 suitably shaped to connect with the bus bar within its tube. In this case I have shown a bus bar 43 of a different channel-shaped cross-section. This bus bar may have internal bosses 43' to assist in retaining the prong. Each prong has a socket portion 41' adapted to receive a branch conductor inserted from the side (not shown) which can be clamped by a screw 42. Bus bar sections can be connected by a connector 44 having jaws 45, 45 adapted to fit in the ends of the adjacent sections as shown in Fig. 5.

The adjacent plugs 40 may have interlocking parts 40' if desired and the sockets in adjacent ducts may be offset or otherwise arranged to ensure connecting or the plug blades with the bus bars of proper polarity. For this purpose, one plug can be slid lengthwise of its duct and the two (or more) plugs locked against further movement by a pin 42' inserted in one of the openings 42x.

Fig. 6a shows three bus bars with their ducts arranged parallel but with the openings 26, 26', 26 arranged offset so as to ensure proper polarity connections of the multiple plugs such as just described.

In Figs. 7 to 10, inclusive, I have shown a fuse-protected branch circuit connector as applied to a bus bar duct system of my invention which may have a bus bar of the section of Fig. 2 or that of Fig. 4.

The insulating housing 50 is constructed to contain a fuse device 51 of any suitable type. This fuse is suspended from an insulating support 52 held in place by springs 53 on the sides of the housing so that the support and attached parts may be inserted and removed from the housing as a unit. This support carries a prong or blade 54 of suitable shape to engage the channel-like bus bars 43 (or 23 of Fig. 2). Fuse clip 55 is electrically connected to prong 54 and fuse clip 56 is electrically connected to the binding post 57 for a conductor 58.

Fig. 10 shows a similar housing 50' but with the clips 53' for holding the support 52 mounted in a different location. This figure also shows a prong 24 of the form suitable for use in bus bar sockets of the form of Figs. 1 and 2.

It will be understood that the duct sections are provided with a number of openings leading to sockets for branch take-off connections so that various connections can be made from time to time. Obviously in such a system there will be times when many of the take-off parts will not be used. In such cases, the unused openings in the ducts can be closed in any suitable manner.

It will be seen from the foregoing that the system is capable of installation in many different ways and is particularly useful for laboratory work where frequent changes have to be made to accommodate the requirements of the system.

I claim:

1. In a bus bar duct system, a plurality of discrete parallel, insulating, tubular, bus bar ducts with openings therein, arranged in groups, one opening in each group being offset laterally with respect to an adjacent opening of said group, a channel-like bus bar enclosed in each duct and accessible through the respective openings and a plurality of discrete branch connector plug devices slidably interconnected to each other and having contact prong elements for detachable connection to the bus bars in said ducts through said openings.

2. In a bus bar duct system, a plurality of discrete parallel, insulating, tubular, bus bar ducts with openings therein, arranged in groups, one opening in each group being offset laterally with respect to an adjacent opening of said group, a channel-like bus bar enclosed in each duct and accessible through the respective openings and a plurality of discrete branch connector plug devices having contact prong elements for detachable connection to the bus bars in said ducts through said openings and having complementary projections and depressions in their body portions for slidable interconnection to each other when in juxtaposed relation to each other.

3. A plug device for a power distribution system having a bus bar duct with a lateral opening therein comprising an insulating housing having side walls and an open top, opposed spring clips on the inner surfaces of the side walls, a carrier member removably mounted in said housing and yieldingly held therein by said clips, fuse clips carried on one surface of said carrier and a contact prong carried on the opposite surface and connected to one of the fuse clips and adapted to be inserted through said opening for connection with a bus bar therein.

HERMAN J. HAMMERLY.

REFERENCES CITED

The following references are of record in the file of this patent:

UNITED STATES PATENTS

| Number | Name | Date |
|---|---|---|
| 1,183,516 | Anderson | May 16, 1916 |
| 1,309,406 | Gilchrist | July 8, 1919 |
| 1,731,661 | Hauenstein | Oct. 15, 1929 |
| 1,832,757 | Saunier | Nov. 17, 1931 |
| 1,966,379 | Dodge | July 10, 1934 |
| 2,038,107 | Harvey | Apr. 21, 1936 |
| 2,043,666 | Kingsbury | June 9, 1936 |
| 2,054,193 | De Mask | Sept. 15, 1936 |
| 2,197,054 | Millermaster | Apr. 16, 1940 |
| 2,264,075 | Frank | Nov. 25, 1941 |
| 2,269,779 | Morten | Jan. 13, 1942 |
| 2,399,408 | Walk | Apr. 30, 1946 |

FOREIGN PATENTS

| Number | Country | Date |
|---|---|---|
| 275,225 | England | Nov. 3, 1927 |
| 312,516 | Germany | May 4, 1915 |